United States Patent

Valdespino

[15] 3,682,310
[45] Aug. 8, 1972

[54] APPARATUS FOR LIQUID WASTE TREATMENT AND MEANS FOR STRIPPING SAME

[72] Inventor: Joseph M. Valdespino, 3609 Old Winter Garden Road, Orlando Fla. 32805

[22] Filed: Oct. 12, 1970
[21] Appl. No.: 80,000

[52] U.S. Cl. .................210/140, 210/217, 210/369
[51] Int. Cl. .............................................B04b 11/04
[58] Field of Search........210/78, 375, 376, 369, 210, 210/216, 217, 213, 140

[56] References Cited

UNITED STATES PATENTS

| 850,241 | 4/1907 | Morris | 210/369 |
| 1,319,150 | 10/1919 | Gibson | 210/369 |
| 1,832,269 | 11/1931 | Webb | 210/369 |
| 2,271,094 | 1/1942 | Pleister | 210/78 X |
| 3,474,905 | 10/1969 | Titus | 210/78 |

Primary Examiner—Jim L. DeCesare
Attorney—Duckworth and Hobby

[57] ABSTRACT

A centrifuge filter apparatus for filtering fluids is provided having a centrifuge drum with a filter medium along its periphery so that when the drum is rotated, fluids will be directed against and through the filter medium and through perforations in the periphery of the drum. A stream of air is intermittently directed against material accumulating on the filter medium for loosening the material and a vacuum is used to remove the loosened material for periodic cleaning of the filter. A stream of fluid may be directed from the outside of the periphery of the drum to assist in loosening accumulated materials trapped by the filter and the bottom of the drum may be perforated and lined with filter material for fluids to pass through when the periphery filter material is clogged. The air stripping jet is adapted to move closer to the periphery wall of the centrifuge drum when stripping materials and a novel combination vacuum seal and brake for the centrifuge drum is provided.

13 Claims, 5 Drawing Figures

Joseph M. Valdespino
INVENTOR

By Duckworth & Hobby

Attorneys

Joseph M. Valdespino
INVENTOR

By Duckworth & Hobby
Attorneys

APPARATUS FOR LIQUID WASTE TREATMENT AND MEANS FOR STRIPPING SAME

BACKGROUND OF THE INVENTION

The present invention relates to the filtering of fluids and especially to a system for the rapid filtering of material in a centrifuge type filter which is provided with means for intermittent cleaning of the filter.

In the past it has been suggested to provide filtration of fluids with filter drum centrifuges operating on a filter principle. These centrifuges typically have perforated sidewalls in a rotating drum which may or may not be covered with a filter cloth along the interior of the perforated wall. As the drum rotates solid particles are retained on the inner wall of the drum and the liquid goes through the perforations and is caught by the outer wall for removal from the centrifuge. Typical of these prior art filter drum centrifuges is the common domestic spin drier used in households and also used in industrial centrifuges. These machines are usually run intermittently; that is, they are filled with a mixture to be centrifuged, spin dried and on completion of the treatment the drum is stopped, and the material removed from the walls. For a continuous action filter drum centrifuge for the separation of the solids from liquids, the drum is usually provided with an internal stationary scraper for continuously removing solid material.

It is accordingly one object of the present invention to provide a novel centrifuge type filter which can economically filter fluids such as water and which can intermittently clean the filter automatically at desired intervals.

It is another object of the present invention to provide a unique seal/brake combination for use in braking a centrifuge filter drum and for sealing the drum during the operation of a vacuum for removing materials that have been filtered from a fluid passing through the centrifuge filter.

Finally, it is an object of the present invention to provide a unique centrifuge filter which provides an alternative filtration when the primary filter medium is clogged with material filtered from the fluids.

SUMMARY OF THE INVENTION

The present invention teaches a centrifuge filter having a rotatable filter drum with perforated walls along its periphery and a filter material located adjacent to and interior of the perforated walls so that the drum acts as a centrifuge when rotated. The centrifuge drum may also have perforations along its bottom which are similarly covered with a filter material so that upon the filter material along the periphery of the drum being clogged, the liquid will be forced through perforations in the bottom of the filter drum. A system of cleaning the filter medium is provided in which a fluid stream is directed against the peripheral material to loosen the material and the loosened material is then vacuumed from the centrifuge. The vacuuming may be done by a venturi formed with the stream of fluid used to loosen the trapped material and the stream of fluid for stripping trapped material from the side of the filter bed may be adapted to move closer to the bed during the stripping operation and to back off when the stripping operation is completed. A fluid jet may also be directed from the opposite side of the periphery walls of the filter drum to assist in loosening material trapped by the filter medium. The vacuum created in the filter drum during the removal of the loosened material is maintained by a flexible seal surrounding the inlet to the filter drum which is pulled against the centrifuge drum by the vacuum and acts as a seal and/or a friction brake by the pressure of the flexible material against the drum slowing the drum to a stop.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

Figure 1:
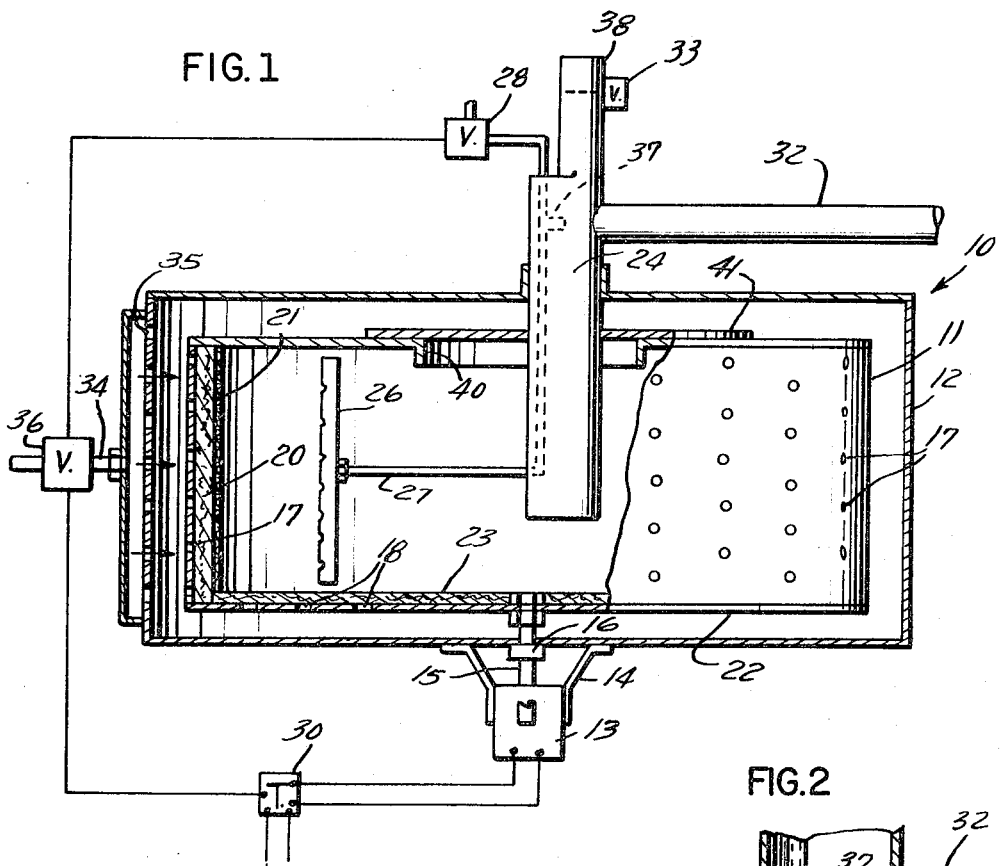
FIG. 1 is a sectional view having portions in diagramatic form of one embodiment of the present invention.
Figure 2:
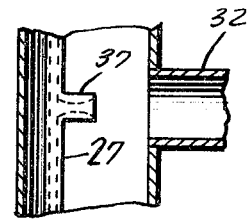
FIG. 2 is a sectional view of the vacuum venturi section of the embodiment of FIG. 1.
Figure 3:
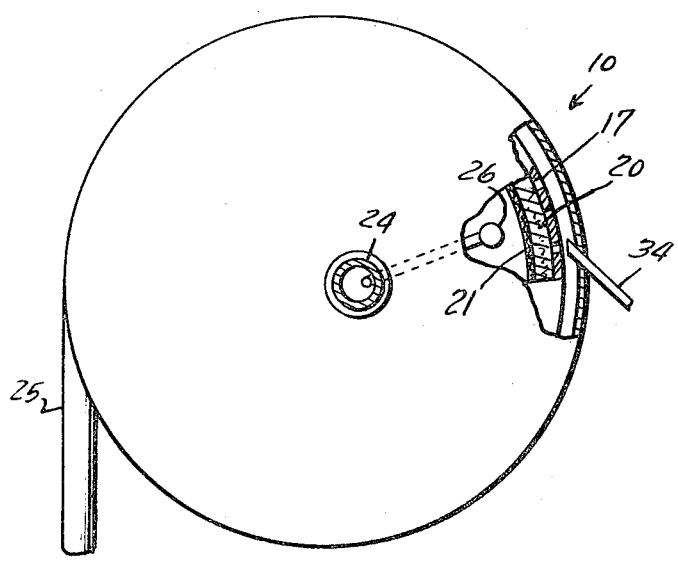
FIG. 3 is a top plan view of FIG. 1.

Referring now to the drawings, FIGS. 1, 2 and 3 illustrate one preferred embodiment of the present invention having a centrifuge 10 with a centrifuge drum 11 and casing 12. Drum 11 is adapted to be rotated by an electric motor 13 mounted to the casing 12 by brackets 14 and connected to the drum 11 by a shaft 15 having seals 16. The drum 11 has perforations 17 around its periphery and perforations 18 along a portion of the bottom of the drum. Along the interior of the periphery of the drum 11 is a filter material 20 which may be held in place by screen 21. The filter material may be sand or diatomaceous earth or any other material desired, and screening 21 can be a metal or plastic screen, cloth or any material to hold the filter medium 20 in place. It should of course be clear that other types of woven filters, and the like, could be used in place of filter medium 20 and screening 21. The bottom 22 of the drum 11 having holes 18 therein, is covered on the inside with a filter cloth or material 23. Fluid may enter the centrifuge drum 11 through a tube 24 while the drum is being rotated by motor 13 which will cause the fluid to be directed along the periphery of the drum by the centrifugal force, forcing the liquid at a relatively high g force through the filter medium 20 and 21 through the perforations 17 into the casing 12 where it is forced out of the casing exit 25 (FIG. 3). This filter provides a very rapid and thorough filtration of fluid passing through it, but it has been found that some materials tend to clog the filter and are difficult to remove. When the filter does become clogged on its surface the fluid will still be thrown with great pressure against the clogged filter and thereafter the force will direct fluid towards the bottom 22 of the drum 11 forcing the fluid through the filter material 23 and out the bottom of the drum. It will of course be clear that the solid materials will have already been forced against the filter medium 20 and 21 against the periphery of the drum 11 so that these bottom perforations 18 which operate substantially only in situations where the filter material is clogged and will not normally get clogged themselves. Once solid materials of the type found in the fluid being filtered have accumulated on the surface 21 around the periphery of the drum 11, these materials are removed by a gas jet 26 such as compressed air being fed through the nozzle 26 which is connected by air tube 27 feeding compressed air into the nozzle portion 26. This air is controlled by a valve 28 which is actuated by timer 30 to indicate when the valve is to be actuated allowing the air to clean or loosen the materials accumulating on the periphery of the drum 11. As the air is being fed to the drum 11 through the tube 27, a small venturi nozzle 31 is directed towards an exhaust tube 32 and also a solenoid or similar type valve 33 shuts off the entrance of fluids to be filtered into the drum allowing the material accumulated to dry by the spinning of the drum. Also assisting in loosening material accumulating on the filter and to a degree loosening the packing of the filter material 20 is a second air stream input tube 34 feeding a series of nozzles 35 directed at the same level as the perforations 17. These air streams may be placed at an angle as illustrated in FIG. 3, and may be placed just prior to the drum reaching the air stripping nozzle 26 so that when the drum rotates it will first be loosened by pushing the solid material along the periphery off filter medium 20 where it is stripped by the jets 26 thus improving the overall operation of the loosening mechanism. The input tube 26 has the input air controlled by a valve 36 which is activated at the same time as valve 28 so that the air from both the nozzles is fed simultaneously to loosen solid material accumulating on the drum. At the same time as the air is activated, it will cause a venturi 37, more clearly illustrated in FIG. 2, to operate the air tube 24 and draw loose materials out tube 32. The nozzle which is directed towards tube 32, creates a vacuum in the tube 24 so that when the material loosened by air nozzles 26 and 35, and using the same air, will create a vacuum within the drum 11 and draw the material loosened out of the drum and out of the tube 32. In order to create this vacuum, valve 33 must close the input for the fluid 38, and some means must be provided for preventing air from coming into the top of the drum 11, opening 40 thus preventing the loss or reduction of the vacuum for removing the loosened material in the drum. This is performed by a combination brake seal 41 placed around tube 24 and which may be attached to the tube 24 to cover the opening 40 and to overlap the top 42 of the drum 11. When the vacuum is applied to the inside of the drum 11 this forces the seal brake 41 against the surface 42 of the drum, sealing the opening 40 from the entrance of air and at the same time applying pressure along the top 42 resulting in a friction brake to slow the drum down.

It will of course be clear that the cleaning operation is being performed after the valve 33 has shut off the entrance of new fluids and the drum has been allowed to rotate to dry the solid materials accumulated along the periphery of the drum 11 and during which short period of time the drum is being cleaned of the solid materials and is being braked to stop the drum. If a braking action were not desired, a seal could be used which did not have a braking action but only sealed the entrance of the drum. The present seal 41 may be constructed of leather or rubber or flexible plastic or any other flexible material having a sufficient stiffness for the proper operation.

In operation, this embodiment receives fluids through its entrance 38 through tube 24 into the drum 11, while the drum is being rotated by the motor 13. The fluids are forced against the exterior surfaces of the drum and out the perforations 17 in the drum through the filter material 20. If the filter material 20 becomes too clogged, fluids will be forced through the lower perforations 18 on the bottom 22 of the drum 11. Once the filtering has been completed and once the drum has sufficiently accumulated solid materials along surface 21 of the drum, valve 33 cuts off the input of additional fluids and the drum is allowed to stand to dry the accumulated solids which generally takes approximately one minute. Once the solids are dried, the air hoses are activated by valves 28 and 35, one pushing the solid materials off the side 21 of drum 11 while the nozzle 26 air stream strips the solid material off of the sides while the venturi 31 is generating a vacuum within the drum because of the cutoff valve 33 and the seal 41. This forces the material in drum 11 through tube 24 and out tube 32, automatically cleaning the interior of the drum. This can be actuated by a timer 30 for automatic operation at predetermined intervals. While a venturi vacuum is illustrated it will of course be clear that separate vacuuming operation could be used to generate a vacuum within the drum or to operate a vacuum nozzle inside of the drum 11. This would utilize additional equipment and has not been found necessary for many operations. It should be mentioned that the present drum cleaning system is for ordinary use and additional cleaning may be required from time to time such as when the filter medium became clogged with lipid type materials, requiring cleaning by running dry cleaning solvents through the system.

Figure 4:
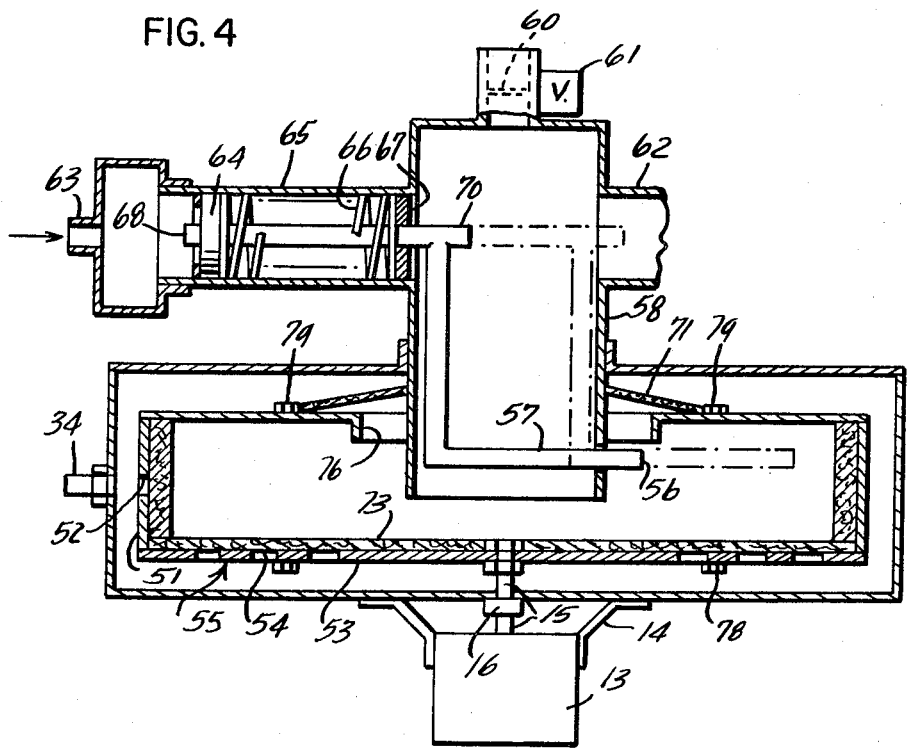
FIG. 4 is a sectional view of a second embodiment of the present invention.

Referring now to FIG. 4, a similar centrifuge 10 is illustrated having a casing 50, centrifuge drum 51 with perforations 52 therein along the exterior peripheral walls 55 while the bottom 53 of the drum 51 has perforations 54 therein. Filter material again is located along the peripheral walls 55 of the drum 51 and also along the bottom 53 in the interior portion of the drum 51. The drum is again driven by a motor 13 having a shaft 14 passing through the casing 50 and connecting to the drum 51 and an air input tube 34 on the exterior of the casing 51. This embodiment similarly has a nozzle 56 connected to an air pressure tube 57 entering through fluid input tube 58 which has an input 60 with a solenoid shutoff valve 61 and an exit 62. However, in contract to the previous embodiment, this embodiment provides for the nozzle 56 to move from one position to a position closer to the peripheral walls 55 during the cleaning operation to provide for a better removal or loosening of the solid materials accumulating along the filter surface. This is performed by the air entering through pipes 63 driving a piston 64 located in a cylinder tube 65 which is held by a spring 66 in its normal position but in which air entering 63 drives the piston against the spring 66 to push the tube 57 along with the nozzle 56 towards the periphery 55 of drum 51. Spring 66 is held by a bracket 67 and the piston 64 has an opening passing therethrough with a tube 68 which becomes tube 57 as it is fixedly attached to piston 64 and slides in the bracket 67. The air pressure entering through tube 63 automatically moves the nozzle 56 towards the interior periphery 55 of the drum 51 to bring the stream of air closer to the solid materials for stripping them away. Similar to the previous embodiment, the tube 57 has a venturi 70 which creates a vacuum in tube 58 in the drum 51, forcing the material out the pipe 62. A seal 71 which may also act as a brake is applied around the tube 58 as already described.

Figure 5:
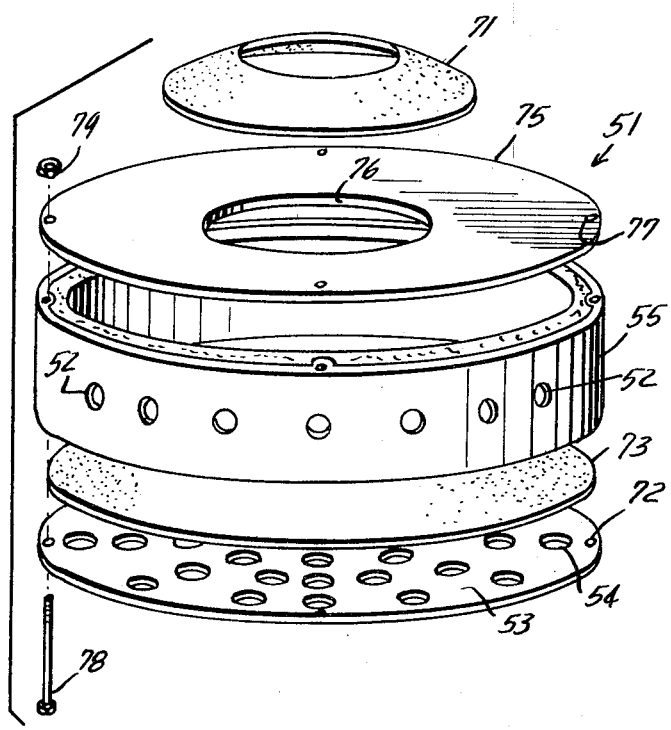
FIG. 5 is an exploded view of the rotating drum of FIG. 4.

FIG. 5 shows an exploded view of the drum 51 of FIG. 4 and has a bottom or base member 53 connected to the motor shaft 14 for rotation when the motor is running. Perforations or holes 54 extend through this base plate, as do bolt holes 72 for bolting the drum together. A filter screen 73 covers the perforations 54 in the base place 53 which filter screen may be cone shaped to get a more uniform filtering action of the material being forced through the bottom 53 of the centrifuge drum. The side or peripheral walls 55 of the drum is illustrated having perforations 52 therein and covered with a filter material 74. The top plate 75 has a center opening 76 therein and also bolt holes 77 for receiving the bolts 78 which passes through the bolt holes 72 and are bolted with nuts 79. Thus the whole assembly may be bolted together. Other systems for assembling the centrifuge drum may be used, with the present embodiments being one preferred embodiment.

Accordingly, the present invention is not to be construed as limited to the particular forms disclosed herein since these are to be regarded as illustrative rather than restrictive.

I claim:

1. A centrifuge filter for filtering fluids comprising in combination:
   a. a casing having inlet and outlet means;
   b. a perforated centrifuge drum means rotatably mounted in said casing with said inlet means opening into said drum means for feeding fluid to be filtered into said drum means;
   c. filter medium located along the periphery of said drum means for filtering fluids passing therethrough:
   d. fluid stripping means extending into said centrifuge drum means for applying a stream of fluid under pressure towards the internal periphery of said drum for loosening material trapped by said centrifuge filter;
   e. suction means extending into the interior of said drum means for removing material loosened by said stream of fluid from said centrifuge filter whereby said periphery filter will filter a fluid, and remove accumulated material filtered from said fluids from said centrifuge filter; and
   f. control means for controlling the sequence of operation of said fluid stripping means and said suction means relative to the inlet of fluid through said inlet means.

2. The centrifuge filter according to claim 1 in which said centrifuge drum means has a filter medium located over a portion of the bottom thereof and said bottom having perforations for the passing of fluids.

3. The centrifuge filter according to claim 1 in which said suction means generates a suction by an asperator driven by fluid from said fluid stripping means.

4. The centrifuge filter according to claim 3 in which said centrifuge drum has an input pipe and a flexible seal encircling said input pipe to seal said drum from air entering around said input pipe when said suction means is removing material from said drum.

5. The centrifuge filter according to claim 4 in which said seal extends over said drum sufficient to act as a friction brake by the seal pressing against the top of said drum.

6. The centrifuge filter according to claim 1 in which said fluid stripping means includes means to move said stream of fluid towards the periphery of said drum when said stripping means is operative while loosening material from said filter.

7. The centrifuge filter according to claim 6 in which said means for moving said stream of fluid includes a piston driven against a spring by the fluid pressure of the fluid stream operating said fluid stripping means.

8. The centrifuge filter according to claim 7 in which said fluid is air.

9. A centrifuge filter apparatus for filtering fluids comprising: a filter centrifuge having a casing surrounding a rotatable mounted perforated drum, said drum having filter means located therein for filtering fluid entering said drum as the fluid passes through the perforations in said drum; the combination thereof with loosening means for loosening material trapped by said filter means in said drum said loosening means including both interior and exterior fluid jets for directing fluid toward the interior and exterior of the periphery of said drum simultaneously, said interior and exterior fluid jets being located in spaced relationship to each other so that the exterior fluid jets will support the loosening of material by the interior jets and removing means for removing said material trapped by said filter means and loosened by said interior and exterior fluid jets from said drums.

10. The apparatus according to claim 9 in which said removing means includes generating suction from said drum with an asperator means located outside said drum for sucking material out of said drum.

11. The apparatus according to claim 10 in which said interior fluid jets have means for extending toward the periphery of said drum when said interior fluid jets are operative, and retracting away from said periphery of said drum when said interior fluid jets are inactivated.

12. The apparatus according to claim 11 in which said filter drum has perforations covered with a filter medium along the periphery and bottom of said drum.

13. The apparatus in accordance with claim 9 having control means, an inlet valve for controlling the input of fluids to be filtered and air flow valves for controlling the flow of fluid to said interior and exterior fluid jets, said control means controlling the opening and closing of said inlet valve and said air flow valves.

* * * * *